United States Patent [19]

Kim

[11] Patent Number: 4,897,291
[45] Date of Patent: Jan. 30, 1990

[54] WOOD SEALANT COMPOSITION
[75] Inventor: Moon Kim, Stone Mountain, Ga.
[73] Assignee: Georgia-Pacific Resins, Inc., Atlanta, Ga.
[21] Appl. No.: 187,419
[22] Filed: Apr. 28, 1988
[51] Int. Cl.⁴ .......................... B05D 3/02; C08L 33/02
[52] U.S. Cl. .................................... 427/393; 427/421; 524/69; 524/71; 524/262; 524/487; 524/488
[58] Field of Search ................... 427/393, 421; 106/33, 106/272; 524/262, 488, 69, 71, 487

[56] References Cited
U.S. PATENT DOCUMENTS

| | | | |
|---|---|---|---|
| 4,268,546 | 5/1981 | Schwartz et al. | 427/393 |
| 4,294,874 | 10/1981 | Howe | 427/393 |
| 4,474,491 | 5/1984 | Bradbury et al. | 427/180 |
| 4,543,287 | 9/1985 | Briggs et al. | 106/18.12 |
| 4,678,700 | 7/1987 | McAloon et al. | 427/215 |

Primary Examiner—Janyce Bell
Attorney, Agent, or Firm—Banner, Birch, McKie & Beckett

[57] ABSTRACT

A sealant composition is provided to seal wood products against moisture absorption and the swelling caused thereby. The sealant composition is especially adapted to be applied to the cut ends of dimensioned lumber and particularly to the edges of wood products such as plywood, waferboard, oriented strand board and particle board. The composition includes a water-based polymeric binder, a wax hydrophobic filler and a water-soluble alkali metal siliconate salt. The polymeric binder preferably has two components. The first is a soft, stretchy polymer with a low glass transition temperature which allows the binder to stretch when the wood swells due to moisture absorption. The second is a polymer with a high glass transition temperature which enhances binding properties.

25 Claims, No Drawings

WOOD SEALANT COMPOSITION

BACKGROUND OF THE INVENTION

1. Field of the Invention

The present invention relates to coating compositions which are applied to wood products in order to minimize the amount of moisture absorbed by the wood. In particular, the present invention relates to a water based sealant composition containing a polymeric binder and a particulate filler. The composition is suited particularly for application to the edges of wood products such as plywood, waferboard, oriented strand board, particle board, and the cut ends of lumber products where water absorption is a problem.

2. Description of the Prior Art

A number of water based acrylic polymer sealants are known in the art. For example, acrylic latex based sealants exhibit desirable properties such as good flexibility, good adhesion to many substrates and resistance to degradation by ultraviolet radiation. However, they have some serious weaknesses, such as poor wet adhesion and poor barrier properties against water penetration.

Others have attempted to improve the water barrier properties of such latex sealants. For example, Bullman in U.S. Pat. No. 4,340,524 introduces a hydrophobic resin in a non-gelling organic solvent, such as a vinyl chloride/vinyl acetate copolymer resin in butyl benzyl phthalate, into the acrylic latex resin in order to improve its water resistance.

Others such as Gregory in U.S. Pat. No. 4,317,755 have provided floor sealants which include a self-polishing film-forming polymer coating and an emulsified hydrocarbon solvent in an aqueous vehicle. Such floor sealants may also include waxes to improve the wear properties of the sealant.

Others such as DeRuiter et al. in U.S. Pat. No. 4,722,953 teach the use of flexible, water-resistant asphalt emulsion coatings for roof and wall surfaces, foundations, paper and cardboard packaging and lumber products. Wax is added to these coatings as an emulsifying agent and to control viscosity.

In recent years roofs in residential and other buildings have been made using sheets of plywood, waferboard, particle board and/or oriented strand board. Shingles or other types of water proof materials are then applied over the wood sheets. During construction the wood sheets may be exposed to rain before the shingles can be applied. When the wood sheets absorb water they swell. After exposure to a hard rain, the thickness of the center portions of a wafer board sheet may expand about 10% or more while the thickness of the board along its edges may expand up to about 25% or more. This is due to the fact that the edges of sheets of plywood, waferboard, oriented strand board and particle board all absorb greater amounts of moisture, and are mechanically weaker against swelling pressure, than the center portions of these same sheets. The expanded board thickness can in general create problems, which are especially serious along the joints where adjacent boards abut against one another. Edge swelling in these areas can cause a ridge to form at a joint, thus preventing shingles and other roofing materials from being evenly applied.

Wickert in U.S. Pat. No. 4,683,260 discloses a cross-linkable clear top coat for plywood and hardwood interior paneling. The coating includes an acrylic latex emulsion polymer having a glass transition temperature of about 20° C. and a non-film forming polymer emulsion having a glass transition temperature of about 100° C. The composition also includes a glass transition temperature of about 100° C. The composition also includes a glycoluril cross-linking agent. Wickert adds Carnauba wax to make his coating buffable and silicon slip aids to make the coating shiny and smooth. The Wickert coating has not been suitable for the manufacture of commercial composite wood products because it must be cured at high temperatures and because it provides poor water barrier properties when applied in commercially acceptable amounts.

Because of the tendency for composite wood products, such as oriented strand board, to swell after absorbing moisture, cured (i.e., cross-linked) or hard (i.e., high glass transition temperature polymer) polymeric sealant coatings, such as those disclosed by Wickert, tend to crack when the wood swells due to moisture absorption. The cracking allows more moisture into the wood eventually causing even greater thickness swelling and further loss of sealant integrity.

Thus, it is an object of the present invention to provide a water based sealant composition having excellent water repellent and water barrier properties for application to wood products in order to minimize moisture absorption by the wood through the coated surface, particularly through the edges of such products. It is another object of the invention to provide a sealant coating composition which dries to form a non-cross linked coating having good flexibility in order to accommodate some swelling of the wood without cracking.

SUMMARY OF THE INVENTION

These and other objects of the invention are met by a sealant composition for application to a wood product in order to minimize moisture absorption into the wood product through the coated surface. The sealant coating composition comprises about 20 to 80 wt. % of an aqueous vehicle; about 2 to 20 wt. % of polymer solids having a glass transition temperature in the range of about −70° to 5° C.; about 3 to 25 wt. % of a hydrophobic filler; and about 0.03 to 1.5 wt. % of a water soluble methyl siliconate.

A preferred sealant composition comprises about 20 to 80 wt. %, and preferably about 30 to 60 wt. %, of an aqueous vehicle; about 2 to 20 wt. %, and preferably about 10 to 20 wt. %, of a first polymer solids having a glass transition temperature of about −70° to 5° C., and preferably about −65° to −20° C., and most preferably about −25° to −35° C., which first polymer is most preferably a styrene-butadiene copolymer supplied as a water-based emulsion; up to about 15 wt. %, and preferably about 3 to 8 wt. %, of a second polymer solids having a glass transition temperature of about 5° to 40° C., and preferably about 20° to 35° C., which second polymer most preferably is a carboxylated styrene-acrylic copolymer having a glass transition temperature of about 20° to 30° C.; about 3 to 25 wt. %, and preferably about 6 to 16 wt. %, of the hydrophobic filler which is most preferably a paraffin wax; and about 0.03 to 1.5 wt. %, preferably about 0.03 to 0.6 wt. %, of the water soluble methyl siliconate which is most preferably sodium methyl siliconate.

The sealant composition is applied to the surface of a wood product in order to seal the surface against moisture absorption. The surface is coated, such as by spraying, brushing, dipping or the like, and then allowed to dry. The sealant composition is useful in sealing the cut ends of lumber and the edges of composite wood products such as plywood, waferboard, oriented strand board, particle board and the like used in roofing and other applications where swelling due to moisture absorption is a particular problem.

DETAILED DESCRIPTION OF THE INVENTION

The first polymer has a glass transition temperature of about −70° to 5° C., and preferably about −65° to −20° C. The glass transition temperature (Tg) of a polymer is the temperature where the properties of the polymer change from that of a brittle solid or glass to those of a rubber. It marks the temperature at which major segments of the polymer chain gain some translational freedom. As is well known, the Tg of a polymer can be determined by plotting specific volume against temperature and noting the temperature at which there is a change in slope.

The first polymer may be a copolymer of ethylenically unsaturated monomers such as ethylene or butadiene and vinyl monomers such as styrene, vinyl esters such as vinyl acetate, vinyl propionate, vinyl butyrates, or esters of acrylic acids such as methyl acrylate, ethyl acrylate and butyl acrylate. Preferably the sealant coating composition comprises about 10 to 20 wt. % of the first polymer which is provided in the form of a water-based emulsion. Most preferably, the first polymer comprises an aqueous emulsion of a styrene-butadiene copolymer having a Tg of about −25° to −65° C. One suitable first polymer is sold as an aqueous emulsion (50% solids) under the trade designation 76 Resin 6140 by Unocal Corp. of Schaumburg, Ill. and has a Tg of −32° C.

The second polymer, which is optionally included in the sealant composition, should have a Tg of about 5° to 40° C., and preferably has a Tg of about 20° C. to 35° C. Suitable polymers can be selected from the group consisting of high binding capacity homopolymers and copolymers of styrene and acrylic monomers. Acrylic unsaturated monomers include alkyl esters of acrylic or methacrylic acid having an alkyl ester portion containing 1 to 12 carbon atoms as well as aromatic derivatives of acrylic and methacrylic acid, and can include, for example, acrylic and methacrylic acid, methyl acrylate and methyl methacrylate, ethyl acrylate and ethyl methacrylate, butyl acrylate and butyl methacrylate, propyl acrylate and propyl methacrylate, 2-ethyl hexyl acrylate and 2-ethyl hexyl methacrylate, cyclohexyl acrylate and cyclohexyl methacrylate, decyl acrylate and decyl methacrylate, isodecyl acrylate and isodecyl methacrylate, benzyl acrylate and benzyl methacrylate and various reaction products such as butyl, phenyl, and cresyl glycidyl ethers reacted with acrylic and methacrylic acids. Preferably the sealant coating composition comprises about 3 to 8 wt. % of the second polymer supplied in the form of a water-based emulsion. Most preferably, the second polymer comprises an aqueous emulsion of a carboxylated styrene-acrylic copolymer having a Tg of about 20° to 30° C. One suitable second polymer is sold as an aqueous emulsion (50% solids) under the trade designation Synthemul 97-710 by Reichold Chemical Co. of Dover, Del. and has a Tg of 18° C.

Based on the above descriptions, those skilled in the art well recognize that the first polymer is a relatively soft and stretchy polymer. This polymer provides good flexibility to the dry sealant composition of the present invention. The second polymer is relatively hard and provides good binding properties to the dry sealant composition.

The sealant composition of the present invention also comprises from about 3 to 25 wt. %, and preferably 6 to 16 wt. %, of a hydrophobic filler. Suitable fillers include waxes, non-film forming polymers which are preferably supplied as an aqueous emulsion and sometimes referred to as "plastic pigments", and asphalt, preferably supplied as an aqueous emulsion.

Both natural and synthetic waxes can be utilized as the hydrophobic filler. Examples of the types of wax which can be utilized include but are not limited to Carnauba wax, beeswax, Japan wax, petroleum wax and synthetic waxes such as esters of fatty acids and higher alcohols. Various waxes can be combined provided each wax is compatible with the other waxes and the polymeric binder. Preferably the wax is provided in the form of an aqueous emulsion. An aqueous emulsion of a petroleum wax such as paraffin wax or a microcrystalline wax or mixtures thereof is most preferred.

The non-film forming polymeric "plastic pigment" may be polystyrene, but can also be a polymer or copolymer of other ethylenically unsaturated monomers such as those disclosed in U.S. Pat. No. 3,423,351. The non-film forming polymer particles can be copolymerized ethylenically unsaturated monomers having a carbon-to-carbon ethylenic double bond unsaturation capable of addition polymerization through the ethylenic double bond and can include, for example, styrene, substituted styrenes, vinyl chloride, vinylidene chloride, acrylonitrile, methacrylonitrile, esters of acrylic and methacrylic acid and tertiary butyl acrylate. Suitable plastic pigment particles also are disclosed in U.S. Pat. Nos. 4,069,186; 4,277,385; and 4,283,320 which, together with U.S. Pat. No. 3,423,351, are incorporated herein by reference.

Suitable asphalt emulsions for use as the hydrophobic filler are disclosed in U.S. Pat. No. 4,722,953 the disclosures of which are incorporated herein by reference.

The most preferred hydrophobic filler comprises an aqueous emulsion of a microcrystalline paraffin wax and/or a regular paraffin wax having a particle size allowing it to be used in a stable polymer latex paint system. One suitable aqueous paraffin wax emulsion is sold under the tradename Mobilcer 67 by the Mobil Oil Corp. of Fairfax, Va.

The sealant composition of the present invention also comprises about 0.03 to 1.5 wt. %, and preferably about 0.03 to 0.6 wt. %, of a water-soluble methyl siliconate. Preferably, the siliconate is an alkali metal methyl siliconate salt. One suitable salt is a water soluble sodium methyl siliconate which is sold as an aqueous solution having a solids concentration of 30% by Dow Corning Corporation, Midland, Mich. under the trade designation Dow Corning 772. Dow Corning 772 has a pH of about 12. Thus when the sealant composition of the present invention comprises about 0.1 to 5 wt. % (0.03 to 1.5 wt. % solids) of Dow Corning 772, the sealant composition will have a pH of about 8–11, and usually about 9–10. The mild alkalinity of this sealant coating composition increases the wetability of the composition on wood surfaces which tend to be slightly acidic.

When the sealant composition of the present invention is applied to a wood surface and allowed to dry, the liquid siliconate has a tendency to migrate to the surface of the coating where it polymerizes to form an outer skin. This outer skin is believed to give the sealant composition of the present invention particularly good water repellant properties.

The aqueous vehicle comprises water, which may contain adjuvants such as surfactants and dispersants especially when components of the sealant composition (e.g., the first and second polymers, the hydrophobic filler, the siliconate, latex pigments, etc.) are introduced as aqueous emulsions. In such cases the water and adjuvants in the aqueous emulsions becomes part of the aqueous vehicle of the sealant composition.

The sealant composition of the present invention also can contain numerous additives such as pigments, gloss controlling agents, biocides, defoaming agents, thickening agents, fillers and dispersants which are conventional in paint-like compositions. Such ingredients can be included in their conventional amounts, as long as they do not adversely affect the desired properties of the composition. Pigments, such as titanium dioxide and other pigments, are particularly desirable from a cosmetic standpoint when coating the edges of composite wood products since the edges otherwise present a rough and unfinished appearance. Mica-containing gloss enhancing agents, silica-containing gloss reducing agents and $TiO_2$-containing pigments can act as both a gloss enhancing/reducing agent or pigment and as a conventional filler material. One suitable mica-containing gloss enhancing agent which can be used in the sealant composition is sold under the trade designation Alisbronze 12, by Franklin Mineral Co. of Wilmington, Mass. A suitable silica-containing gloss reducing agent is sold under the trade designation Celite 281 by Manville Corp. of Denver, Colo.

The sealant composition generally has a #4 Ford cup viscosity of about 10 to 45 seconds, and preferably about 20 to 35 seconds, as is common in aqueous based paints. Thickening agents may be used in a conventional manner to obtain the desired viscosity.

The sealant composition of the present invention can be applied to wood surfaces in a conventional fashion, such as by spray coating, brush coating or dipping. The sealant composition is generally applied to a wood surface at a level of about 0.1 to 0.4 gm/in$^2$, and preferably about 0.15 to 0.2 gm/in$^2$. The coating is then allowed to dry on the wood surface.

In general, the ingredients of the sealant composition may be admixed in any order desired. However, when additives such as silica gloss controlling agents and/or inorganic solid pigments are used, it is generally preferred to premix the inorganic particulate solids with water, thickeners, dispersants and defoaming agents, under high shear mixing conditions in order to adequately disperse the particles. This can then be followed by the addition of the remaining ingredients under slower mixing conditions.

The following examples are provided to further illustrate the present invention and are not intended to be limiting in scope. All temperatures are in degrees centigrade and all parts and percentages are by weight.

EXAMPLE 1

A sealant composition was prepared as follows. In a Cowles high speed mixer the following components were charged:

| Ingredient | Concentration (%) | Weight (%) |
|---|---|---|
| Fresh water | — | 36.0 |
| Biocide | 30 | 0.2 |
| Thickener | 100 | 0.2 |

The above three ingredients were mixed at low speed for 30 minutes until the suspension became clear. At this time, the following ingredients were charged to the mixer:

| Ingredient | Concentration (%) | Weight (%) |
|---|---|---|
| Dispersant (potassium tripolyphosphate) | 100 | 0.3 |
| Defoaming agent | 30 | 0.1 |
| Pigment | 100 | 0.6 |
| Mica gloss enhancing agent | 100 | 6.0 |

After adding the above-identified ingredients, the mixer was operated under high speed mixing conditions (1500 rpm) for a period of 15 minutes, followed by slow agitation (60 rpm). Next, the following additional ingredient was charged to the Cowles mixer and mixed under continued slow agitation:

| Ingredient | Concentration (%) | Weight (%) |
|---|---|---|
| Sodium methyl siliconate | 30 | 0.9 |

The following ingredients were then consecutively loaded into the mixer under continued slow agitation:

| Ingredient | Concentration (%) | Weight (%) |
|---|---|---|
| Defoaming agent | 30 | 0.2 |
| Pine Oil | 100 | 0.1 |
| Pigments | 50 | 3.0 |
| Aqueous paraffin wax emulsion | 65 | 24.0 |
| First polymer: styrene butadiene copolymer as an aqueous emulsion (Tg = −32° C.) | 50 | 28.0 |
| Water | — | 0.2 |

Following the addition of all of the above-identified ingredients, the mixture was agitated for an additional 5 minutes at which time the viscosity of the mixture was measured using a #4 Ford Cup Viscometer. The measured viscosity was 20 seconds. The viscosity can be adjusted further using an acrylic thickener. Following the measurement, 0.3 wt. % of a 30% solids aqueous emulsion of an acrylic thickener was added and the mixture mixed to obtain a final viscosity of 25–30 seconds.

EXAMPLE 2

A sealant composition was prepared as follows. In a Cowles high speed mixer the following components were charged:

| Ingredient | Concentration (%) | Weight (%) |
|---|---|---|
| Fresh water | — | 24.3 |
| Thickener | 100 | 0.3 |

The above two ingredients were mixed at low speed for 30 minutes until the suspension became clear. At this time, the following ingredients were charged to the mixer:

| Ingredient | Concentration (%) | Weight (%) |
|---|---|---|
| Dispersant (potassium tripolyphosphate) | 100 | 0.2 |
| Defoaming agent | 30 | 0.1 |
| Silica gloss reducing agent | 100 | 6.0 |
| TiO$_2$ Pigment | 100 | 0.5 |
| Biocide | 100 | 0.2 |

After adding the above-identified ingredients, the mixer was operated under high speed mixing conditions (1500 rpm) for a period of 15 minutes, followed by slow agitation (60 rpm). Next, the following additional ingredients were charged to the Cowles mixer and mixed under continued slow agitation:

| Ingredient | Concentration (%) | Weight (%) |
|---|---|---|
| Water | — | 9.8 |
| Sodium methyl siliconate | 30 | 0.9 |

The following ingredients were then consecutively loaded into the mixer under continued slow agitation:

| Ingredient | Concentration (%) | Weight (%) |
|---|---|---|
| Second polymer: carboxylated styrene-acrylic copolymer as an aqueous emulsion (Tg = 18° C.) | 50 | 10.0 |
| Pigment | 30 | 1.6 |
| Aqueous paraffin wax emulsion | 65 | 20.0 |
| First polymer: styrene butadiene copolymer as an aqueous emulsion (Tg = −32° C.) | 50 | 26.0 |

Following the addition of all of the above-identified ingredients, the mixture was agitated for an additional 5 minutes at which time the viscosity of the mixture was measured using a #4 Ford Cup Viscometer. The measured viscosity was 20 seconds. The viscosity was increased by adding 0.2 wt. % of an acrylic thickener (aqueous emulsion, 30% solids) to obtain a final viscosity of 25–30 seconds.

EXAMPLE 3

The water barrier efficiencies of the sealant compositions of Examples 1 and 2 were determined by the "Sponge" method, which is similar to the National Kitchen Cabinet Association (Louisville, KY) test procedure used to evaluate the water resistance of wooden cabinet doors. This test procedure is described in Research Report No. R & D 87L-14 of the American Plywood Association, Tacoma, Wash. The test substrate was an oriented strand board cut into two 6"×6" pieces. One piece was used as a control and the other as the test substrate. One edge of the test substrate was coated with the sealant composition and allowed to dry for 24 hours. The spread rate was 0.20 gm/in$^2$. The control piece received no coating. The two pieces were then placed test edge down on a wet sponge for 24 hours. The thickness of the test edges were measured before and after the sponge test and each calculated to give the % thickness swell (Ts). Water barrier efficiency is calculated as, $$\text{Efficiency} = \frac{Ts(\%)\text{control} - Ts(\%)\text{sample}}{Ts(\%)\text{control}} \times 100$$

The Example 1 coating had an efficiency of 80%, meaning that 80% of the thickness swell is reduced by use of the sealant composition of Example 1. The Example 2 coating had an efficiency of 82%.

Although the invention has been described in its preferred forms in the examples which utilize specific polymers and other components, it is understood that the disclosure of the preferred forms of the invention have been made only by way of example and that numerous changes may be made to the formulation without departing from the spirit and scope of the invention as defined in the appended claims.

I claim:

1. A sealant composition for application to a wood product to minimize moisture absorption by the wood product through a surface, comprising:
   (a) about 20 to 80 wt. % of an aqueous vehicle;
   (b) about 2 to 20 wt. % of first polymer solids having a glass transition temperature in the range of about −70° to 5° C.;
   (c) about 3 to 25 wt. % of a hydrophobic filler; and
   (d) about 0.03 to 1.5 wt. % of a water soluble methyl siliconate.

2. The sealant composition of claim 1, wherein the first polymer has a glass transition temperature in the range of about −65° to −20° C. and is supplied to said composition as a water based emulsion.

3. The sealant composition of claim 1, wherein the first polymer solids are selected from the group consisting of homopolymers and copolymers of styrene and butadiene monomers.

4. The sealant composition of claim 1, wherein the first polymer comprises a styrene-butadiene copolymer having a glass transition temperature of about −32° C.

5. The sealant composition of claim 1, which further includes up to about 15 wt. % of second polymer solids having a glass transition temperature in the range of about 5° to 40° C.

6. The sealant composition of claim 5, wherein the second polymer is selected from the group consisting of homopolymers and copolymers of styrene and acrylic monomers and is supplied to said composition as a water-based emulsion.

7. The sealant composition of claim 6, wherein the second polymer comprises a carboxylated styrene-acrylic copolymer having a glass transition temperature of about 20° C.

8. The sealant composition of claim 1, wherein the filler is selected from the group consisting of wax, plastic pigments, asphalt and combinations thereof.

9. The sealant composition of claim 8, wherein the filler comprises an aqueous emulsion of a microcrystalline paraffin wax.

10. The sealant composition of claim 1, wherein the filler has a particle size allowing it to be suspended in the coating composition.

11. The sealant composition of claim 1, wherein the water soluble methyl siliconate comprises an alkali metal methyl siliconate salt.

12. The coating composition of claim 11, wherein the siliconate comprises sodium methyl siliconate.

13. A sealant composition for application to a wood product to minimize moisture absorption by the wood product through a surface, comprising:
(a) about 30 to 60 wt. % of an aqueous vehicle;
(b) about 10 to 20 wt. % of first polymer solids having a glass transition temperature in the range of about −65° to −20° C.;
(c) about 3 to 8 wt. % of second polymer solids having a glass transition temperature of about 20° to 35° C.;
(d) about 6 to 16 wt. % of a hydrophobic filler; and
(e) about 0.03 to 0.6 wt. % of a water soluble alkali metal methyl siliconate.

14. The sealant composition of claim 13, wherein the first polymer comprises a styrene-butadiene copolymer having a glass transition temperature of about −25° to −65° C. and is supplied to said composition as a water-based emulsion.

15. The sealant coating composition of claim 14, wherein the second polymer comprises a carboxylated styrene-acrylic copolymer having a glass transition temperature of about 20° to 30° C. and is supplied to said composition as a water-based emulsion.

16. The sealant composition of claim 15, wherein the filler comprises a microcrystalline paraffin wax supplied to said composition as an aqueous emulsion.

17. The sealant composition of claim 13, wherein the alkali metal methyl siliconate comprises sodium methyl siliconate.

18. A method of sealing a wood product against moisture absorption comprising applying the sealant composition of claim 1 to a surface of the wood product and allowing the sealant to dry.

19. The method of claim 18 wherein the wood product is a composite wood product selected from the group consisting of plywood, waferboard, oriented strand board and particle board.

20. The method of claim 19, wherein the sealant composition is applied to an edge of the plywood, waferboard, oriented strand board or particle board.

21. The method of claim 18 wherein the sealant composition is applied by spraying onto the wood surface.

22. A method of sealing a wood product against moisture absorption comprising applying the sealant composition of claim 13 to a surface of the wood product and allowing the sealant to dry.

23. The method of claim 22 wherein the wood product is a composite wood product selected from the group consisting of plywood, waferboard, oriented strand board and particle board.

24. The method of claim 23, wherein the sealant composition is applied to an edge of the plywood, waferboard, oriented strand board or particle board.

25. The method of claim 22 wherein the sealant is applied by spraying onto the wood surface.

* * * * *